3,418,228
PHOTOCHEMICAL CHLORINATION OF ACETONITRILE

Philip Lee Bartlett, New Castle County, Del., assignor to E. I. du Pont de Nemours and Company, Wilmington, Del., a corporation of Delaware
No Drawing. Filed Jan. 28, 1966, Ser. No. 523,575
7 Claims. (Cl. 204—158)

This invention relates to a process for the preparation of trichloroacetonitrile by the photochemical chlorination of acetonitrile, and more particularly to the liquid phase photochemical chlorination of acetonitrile in the presence of a catalyst.

Chlorination of acetonitrile has been investigated in both liquid and vapor phases. Catalytic vapor phase chlorinations are known, utilizing as catalyst a noble metal as described in U.S. Patent No. 2,426,091 or a carbon supported halide of zinc, copper or an alkaline earth metal as described in U.S. Patent No. 2,375,545. However, these vapor phase reactions possess the inherent disadvantage of requiring high temperatures, such as 200–400° C., and they also favor the formation of polymers and side products. Vapor phase photochemical chlorination of acetonitrile was reported to be unsuccessful in Bull. Soc. Chem. Belg. 61, 366 (1952).

Liquid phase photochemical chlorination of acetonitrile is described in British Patent 522,835. The main disadvantage of this process is the long induction period. It has been found that no appreciable chlorination occurs in the first 8 hours of exposure to the reaction conditions described.

U.S. Patent No. 2,745,868 describes a liquid phase chlorination without the necessity of using light by reacting chlorine and acetonitrile in the presence of hydrogen chloride. About 25 to 40 hours are necessary for the chlorination and a large amount of hydrogen chloride is required, preferably enough to saturate the acetonitrile. In addition to the unsuitably long reaction time, the large amount of hydrogen chloride required tends to favor the formation of polymers.

It is an object of this invention to provide a liquid phase chlorination which gives good yields of trichloroacetonitrile. Another object is to provide a process for the liquid phase chlorination of acetonitrile which requires only a short reaction time. These and other objects will become apparent from the following description of this invention.

It has now been found that trichloroacetonitrile can be prepared in good yield under mild reaction conditions and short reaction times by reacting acetonitrile and chlorine at 60–80° C. in the presence of (1) actinic light, (2) hydrogen chloride and (3) a catalyst selected from the group consisting of mercuric chloride, mercuric acetate, mercuric sulfate, mercuric oxide, aluminum chloride, aluminum fluoride and boron trifluoride etherate and recovering trichloroacetonitrile from the reaction mixture. By the use of the specific catalysts of this invention, satisfactory liquid phase photochemical chlorination can be achieved in a surprisingly short time. In the absence of these catalysts, there is no appreciable chlorination under the same reaction conditions.

The chlorination reaction of this invention follows the equation:

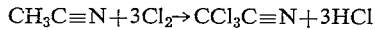

$$CH_3C\equiv N + 3Cl_2 \rightarrow CCl_3C\equiv N + 3HCl$$

Theoretically about 3 moles of chlorine react with each mole of acetonitrile. It has been found that optimum yields are obtained when the amount of chlorine fed into the system is about 2.5 moles per mole of acetonitrile. As the amount of chlorine is increased to 3 moles, trimerization of the product occurs. When 2.7 moles of chlorine are used, about 5–10% of the product may trimerize. In general, the amount of chlorine should be about 1–3 moles, and preferably about 2.1–2.5 moles.

The reaction of this invention is carried out in the presence of actinic light. Preferably ultraviolet light is used. A convenient source of ultraviolet light is a mercury vapor lamp.

The chlorination is conducted at about 60–80° C. Below about 60° C., the reaction is very slow and it is difficult to properly vent the hydrogen chloride formed in the reaction. The accumulation of large excesses of hydrogen chloride tend to favor polymer formation. Temperatures above about 80° C. should be avoided since acetonitrile boils at about 82° C. Preferably temperatures of about 65–75° C. are employed.

About 1–5% by weight of hydrogen chloride, based on the acetonitrile, is employed. When less than about 1% of hydrogen chloride is used, some chlorination occurs, but there is a long induction period. More than about 5% is not necessary, since hydrogen chloride is generated during the reaction. Preferably about 1.5–3% of hydrogen chloride is present.

The catalysts used in accordance with this invention are soluble in acetonitrile and are selected from the group consisting of mercuric chloride, mercuric acetate, mercuric sulfate, mercuric oxide, aluminum chloride, aluminum fluoride and boron trifluoride etherate. Preferably mercuric chloride, mercuric acetate, aluminum chloride or boron trifluoride etherate is employed.

At least about 0.1% by weight of catalyst, based on the acetonitrile, should be used for satisfactory results. No added benefit is achieved by the use of more than about 10% catalyst, although larger amounts could be used if desired without adversely affecting the reaction. Preferably about 0.25–5% catalyst is employed.

The process of the invention may be carried out in conventional reaction vessels used for photochemical reactions, for example, a quartz tube. As the source of actinic light, conventional 110 v. low pressure mercury vapor lamps are suitable. Acetonitrile is placed into the quartz tube, a small amount of hydrogen chloride gas and catalyst are introduced and the mixture is heated to 60–80° C. Chlorine gas is fed into the system until the desired amount has been added. The resulting reaction mass containing a mixture of trichloroacetonitrile and acetonitrile is then cooled to room temperature. Although the reaction mixture forms an azeotrope upon distillation, acetonitrile can be isolated from the mixture by conventional means known in the art, for example, by distillation with an aliphatic hydrocarbon solvent or by washing the mixture with water.

Conversions, based on the chlorine charged, range from about 25–90% depending upon the conditions and catalyst employed. Yields of trichloroacetonitrile of the order of about 65–97% are readily achieved in less than about 8 hours. Under the preferred conditions, conversions of about 80–90%, based on the chlorine charged, and yields of about 95–97%, based on the conversion, are obtained in about 6 hours or less.

The following examples, illustrating the novel process disclosed herein, are given without any intention that the invention be limited thereto. All parts and percentages are by weight.

EXAMPLES 1–13

General Procedures.—Acetonitrile, 70.47 parts, were placed in a quartz tube along with varied amounts of the catalysts disclosed herein. Two parts of anhydrous hydrogen chloride were added. Two 110-volt low pressure mercury vapor lamps placed two inches from the reactor tube were used as the light source. The mixture was heated to 70±5° C. Chlorine gas was fed into the tube through a sintered blass plate at the rate of 25 parts per hour for six hours, amounting to a total of 150 parts or 1.23 moles of chlorine per mole of acetonitrile. The reactor tube was provided with an outlet for the evolved hydrogen chloride. The outlet gases were fed into Dry Ice/acetone cooled traps to collect any chlorine which failed to react or was swept out of the system by the vented hydrogen chloride.

The quantity of chlorine consumed was determined by subtracting the amount found in the traps from the total quantity fed into the reactor. The reaction mixture containing trichloroacetonitrile and acetonitrile was cooled and the trichloroacetonitrile was separated by washing acetonitrile from the mixture with water. Prior to washing out the unreacted acetonitrile, the mixture was analyzed by vapor phase chromatography to determine the composition of the reaction mixture.

For comparison, a Control Run, not within the scope of the invention, was carried out following the above procedure except that no catalyst was added. Hydrogen chloride was added as indicated above.

The following table summarizes the results obtained using the type and amount of catalyst indicated. Assuming 100% chlorine consumption the maximum theoretical conversion of acetonitrile is 41% due to the excess acetonitrile present.

TABLE I

| Example | Catalyst | Catalyst, percent based on $CH_3CN$ | $CCl_3CN$ yield, parts | Conversion, percent based on— | | $CCl_3CN$ yield, percent based on $CH_3CN$ reacted |
|---|---|---|---|---|---|---|
| | | | | $Cl_2$ | $CH_3CN$ | |
| 1 | $HgCl_2$ | 0.25 | 72.3 | 74 | 30.7 | 96 |
| 2 | $HgCl_2$ | 0.75 | 76.5 | 79 | 32.4 | 95 |
| 3 | $HgCl_2$ | 1.5 | 80.3 | 83 | 34.1 | 95 |
| 4 | $HgCl_2$ | 5.0 | 88.0 | 91 | 37.3 | 93 |
| 5 | $HgOOCCH_3$ | 0.75 | 72.3 | 74 | 30.7 | 96 |
| 6 | $HgOOCCH_3$ | 1.5 | 79.1 | 80 | 32.8 | 97 |
| 7 | $BF_3 \cdot (C_2H_5)_2O$ | 5.0 | 58.8 | 60 | 24.6 | 96 |
| 8 | $BF_3 \cdot (C_2H_5)_2O$ | 7.5 | 78.7 | 84 | 34.4 | 92 |
| 9 | $AlCl_3$ | 1.5 | 23.9 | 35 | 14.4 | 83 |
| 10 | $AlCl_3$ | 5.0 | *38.1 | 56 | 23.0 | 67 |
| 11 | $AlF_3$ | 1.5 | 29.8 | 34 | 14.0 | 86 |
| 12 | $HgSO_4$ | 1.5 | *24.1 | 32 | 13.1 | 74 |
| 13 | $HgO$ | 1.5 | 22.8 | 28 | 11.5 | 80 |
| Control | None | 0 | 0 | 0 | 0 | 0 |

*A significant amount of dichloroacetonitrile was formed.

From the above table the pronounced catalytic effect of the specified catalysts can be seen. In the Control Run no conversion was obtained. The same result is obtained when both the hydrogen chloride and catalyst are omitted.

EXAMPLES 14–15

The procedure used in Examples 1–13 was followed except that 35.2 parts of acetonitrile were placed in a quartz tube having only half the volume of the tube used previously. The mole ratio of chlorine to acetonitrile was 2.46:1. There was essentially no polymeric by-product formation. The following data were obtained.

TABLE II

| Example | Catalyst | Catalyst, percent based on $CH_3CN$ | $CCl_3CN$ yield, parts | Conversion, percent based on— | | $CCl_3CN$ yield, percent based on $CH_3CN$ reacted |
|---|---|---|---|---|---|---|
| | | | | $Cl_2$ | $CH_3CN$ | |
| 14 | $HgCl_2$ | 1.5 | 81.1 | 84 | 69 | 95 |
| 15 | $HgCl_2$ | 5.0 | 86.2 | 89 | 73 | 95 |

Although the invention has been described and exemplified by way of specific embodiments, it is to be understood that it includes all modifications and variations coming within the scope of the following claims.

I claim:

1. A process for the preparation of trichloroacetonitrile which comprises reacting acetonitrile with chlorine at 60–80° C. in the presence of (1) actinic light, (2) hydrogen chloride and (3) a catalyst selected from the group consisting of mercuric chloride, mercuric acetate, mercuric sulfate, mercuric oxide, aluminum chloride, aluminum fluoride and boron trifluoride etherate and recovering trichloroacetonitrile from the reaction mixture.

2. The process of claim 1, in which 1–3 moles of chlorine per mole of acetonitrile, 1–5% by weight of hydrogen choride, based on acetonitrile, and at least 0.1% by weight of catalyst, based on acetonitrile, are present.

3. The process of claim 2, in which the temperature is 65–75° C.

4. The process of claim 3, in which 2.1–2.5 moles of chlorine per mole of acetonitrile, 1.5–3% by weight of hydrogen chloride, based on acetonitrile, and 0.25–5% by weight of catalyst, based on acetonitrile, are present.

5. The process of claim 4, in which the catalyst is mercuric chloride.

6. The process of claim 4, in which the catalyst is mercuric acetate.

7. The process of claim 4, in which the catalyst is boron trifluoride etherate.

References Cited

UNITED STATES PATENTS 2,283,237   5/1942   Spence et al. ____ 204—158 XR

FOREIGN PATENTS 522,835   6/1940   Great Britain.

HOWARD S. WILLIAMS, *Primary Examiner.*